United States Patent
Colantonio

(10) Patent No.: US 9,890,025 B2
(45) Date of Patent: Feb. 13, 2018

(54) MECHANICAL TIPPING ASSEMBLY FOR MOBILE DRIVE UNIT OF INVENTORY SYSTEM

(71) Applicant: Amazon Technologies, Inc., Seattle, WA (US)

(72) Inventor: Peter Thomas Colantonio, North Andover, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/951,125

(22) Filed: Nov. 24, 2015

(65) Prior Publication Data

US 2017/0144873 A1    May 25, 2017

(51) Int. Cl.
*B66F 9/20* (2006.01)
*B66F 9/065* (2006.01)
*B66F 9/06* (2006.01)
*B66F 9/075* (2006.01)

(52) U.S. Cl.
CPC ............... *B66F 9/20* (2013.01); *B66F 9/063* (2013.01); *B66F 9/065* (2013.01); *B66F 9/07559* (2013.01)

(58) Field of Classification Search
CPC .. B66F 9/20; B66F 9/065; B66F 9/063; B66F 9/07559
USPC ................................................. 180/218, 282
See application file for complete search history.

(56) References Cited

U.S. PATENT DOCUMENTS

| | | | |
|---|---|---|---|
| 6,367,824 B1* | 4/2002 | Hayashi | B62K 5/05 280/124.103 |
| 7,152,882 B2* | 12/2006 | Tokumaru | B62D 57/04 180/8.2 |
| 8,280,547 B2* | 10/2012 | D'Andrea | B66F 9/063 700/214 |
| 9,087,314 B2 | 7/2015 | Hoffman et al. | |
| 2006/0260857 A1* | 11/2006 | Kakinuma | A63C 17/08 180/218 |
| 2007/0288123 A1 | 12/2007 | D'Andrea et al. | |
| 2008/0147281 A1* | 6/2008 | Ishii | B62D 51/005 701/49 |
| 2009/0256331 A1* | 10/2009 | Horiguchi | B60G 21/007 280/304.1 |
| 2010/0219011 A1* | 9/2010 | Shimoyama | B62D 37/04 180/218 |
| 2013/0032423 A1* | 2/2013 | Chen | A63C 17/0073 180/218 |
| 2014/0361501 A1 | 12/2014 | Lin et al. | |
| 2016/0167557 A1 | 6/2016 | Mecklinger | |

FOREIGN PATENT DOCUMENTS

DE    102013013438 A1    2/2015
EP    0102706 A1    3/1984

OTHER PUBLICATIONS

PCT/US2016/063380, "International Search Report and Written Opinion", dated Mar. 2, 2017, 11 pages.

* cited by examiner

*Primary Examiner* — Joseph J Hail
*Assistant Examiner* — Joel Crandall
(74) *Attorney, Agent, or Firm* — Kilpatrick Townsend & Stockton LLP

(57) ABSTRACT

A mobile drive unit for an inventory system includes a base suspended from a frame by a pivot assembly, such as a first link and a second link. The base supports a platform configured to engage an inventory holder of the inventory system. Movement of the base causes the platform to tip, such as away from a direction of a reaction force acting on the base due to acceleration or deceleration of the mobile drive unit.

17 Claims, 9 Drawing Sheets

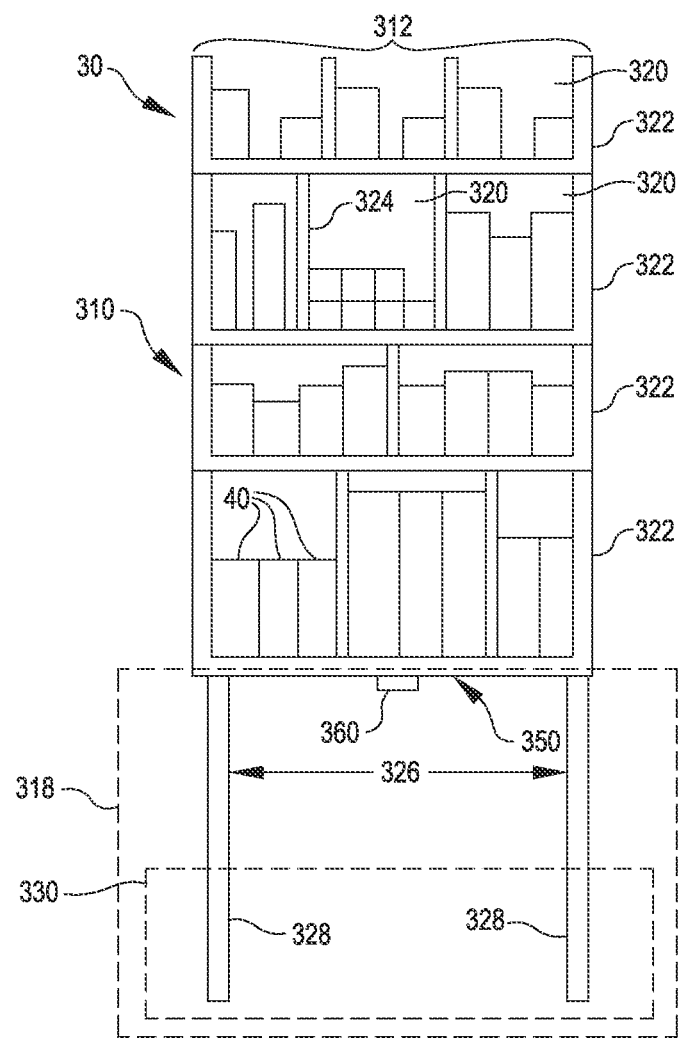

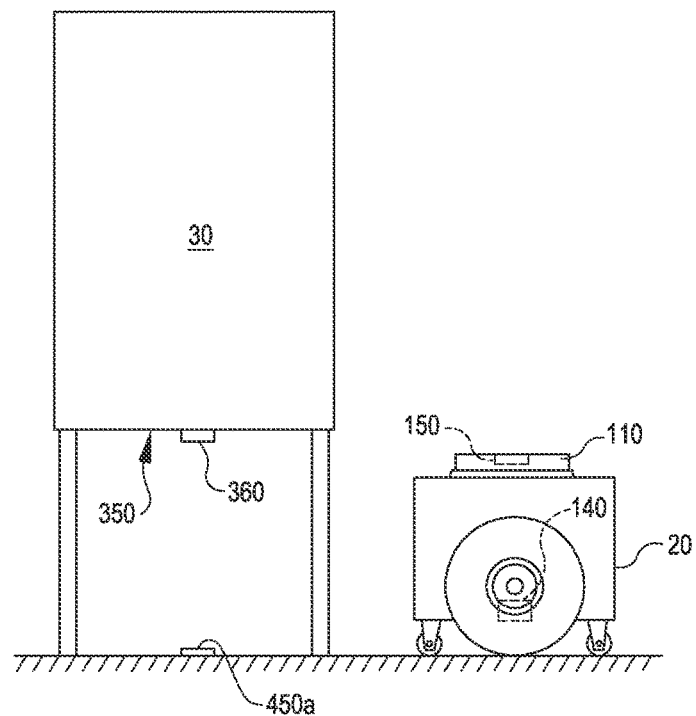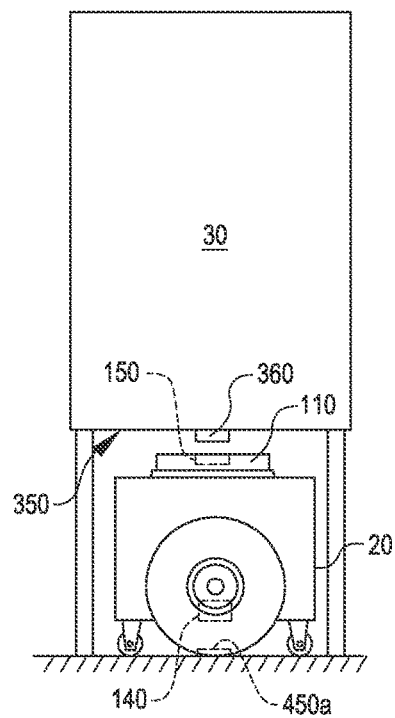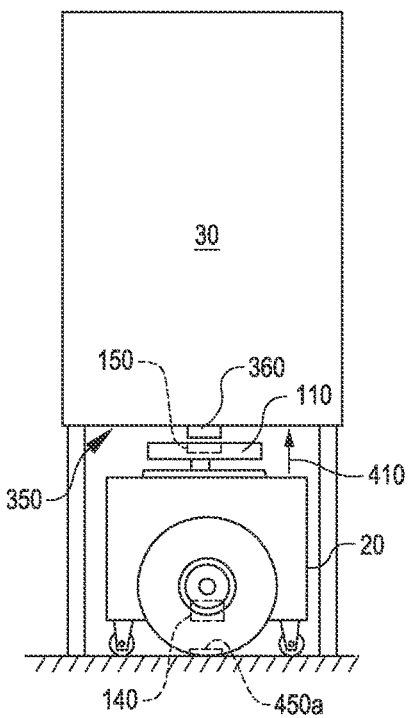

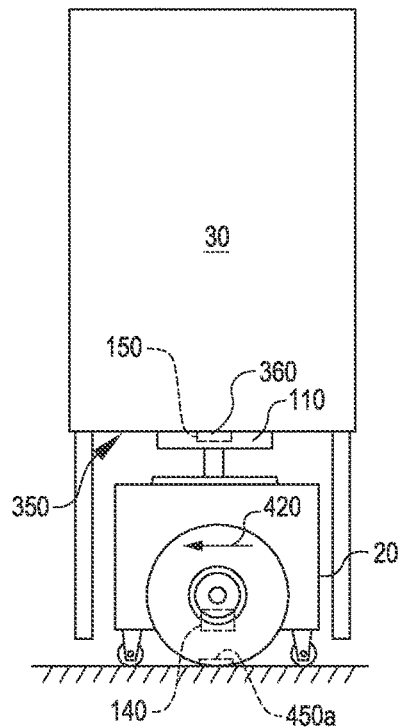
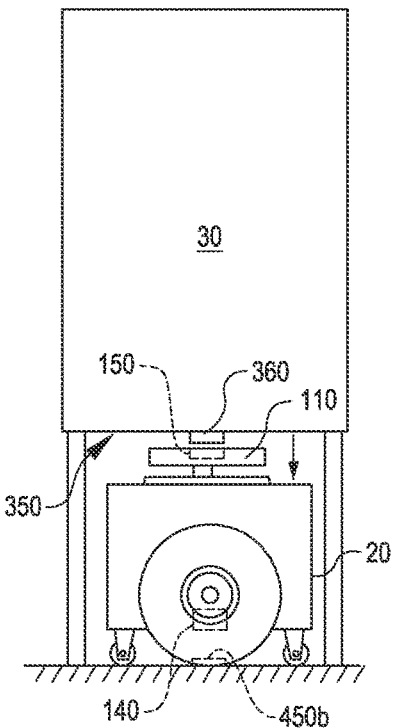
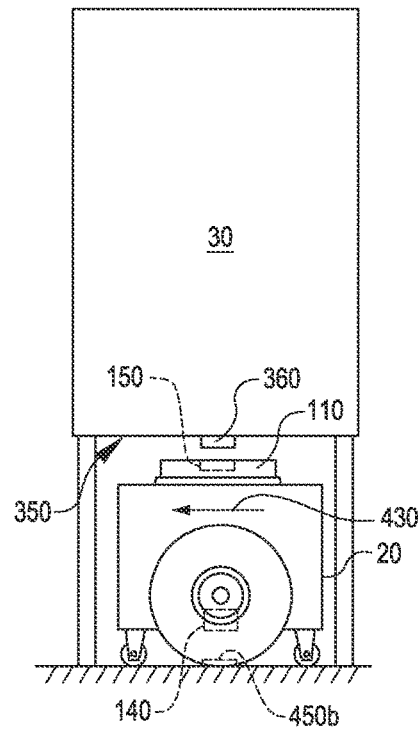

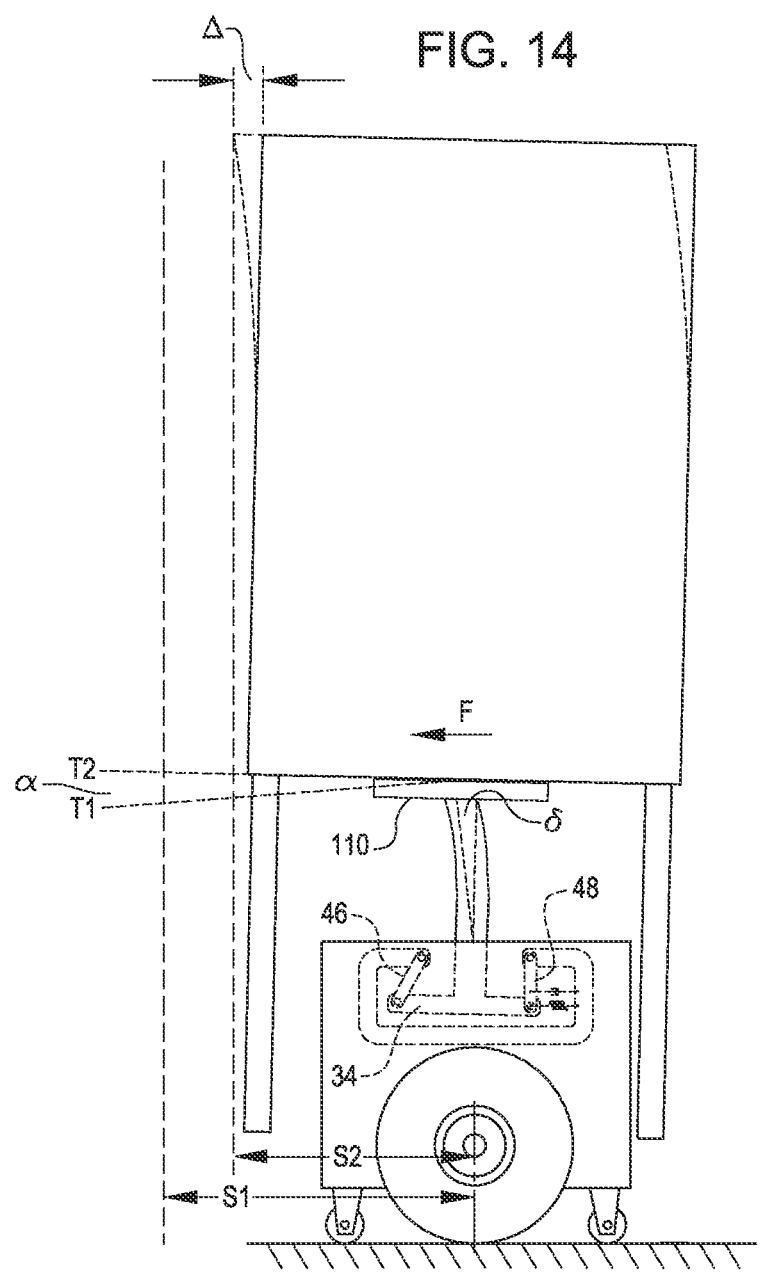

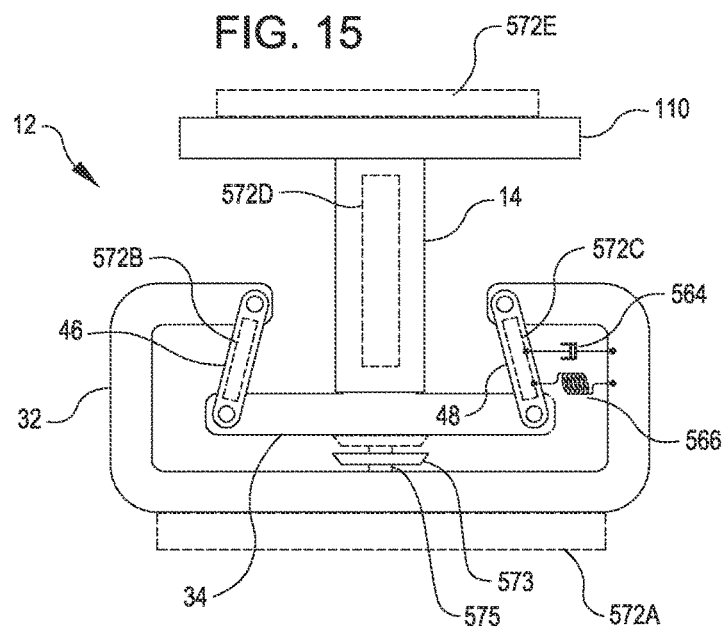
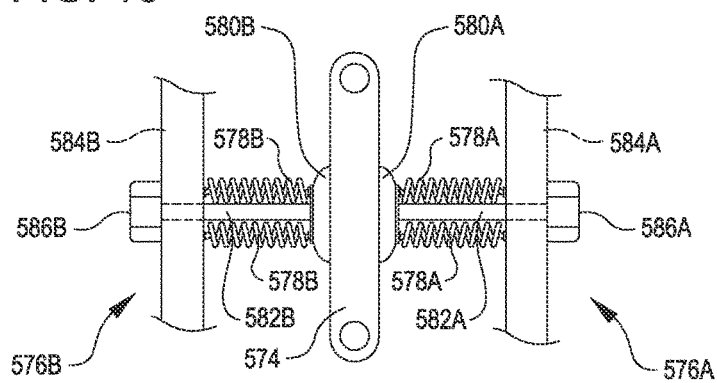
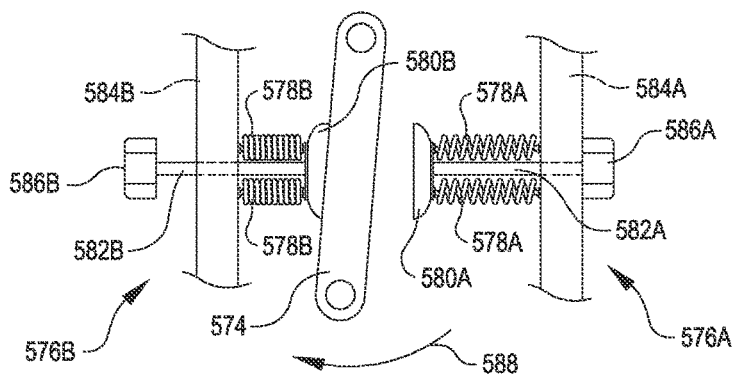

MECHANICAL TIPPING ASSEMBLY FOR MOBILE DRIVE UNIT OF INVENTORY SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

BRIEF DESCRIPTION OF THE DRAWINGS

Various embodiments in accordance with the present disclosure will be described with reference to the drawings, in which:

FIG. 6 illustrates in greater detail an example inventory holder that may be utilized in particular embodiments of the inventory system shown in FIG. 2;

FIGS. 7-12 show operation of various components of a mobile drive unit and an inventory holder (e.g., of the inventory system shown in FIG. 2) during docking, movement, and undocking;

FIG. 14 illustrates an example of a docked mobile drive unit and inventory holder (e.g., of the inventory system shown in FIG. 2) experiencing a reduced amount of sway through a mechanical tipping assembly according to certain embodiments;

FIG. 15 is a schematic illustration showing various components of a mechanical tipping assembly in greater detail according to certain embodiments;

FIG. 16 illustrates an example of an arrangement for restricting movement of an lit element (e.g., an element of the mechanical tipping assembly of FIG. 15) when force applied to the element does not exceed a threshold according to certain embodiments; and FIG. 17 illustrates the arrangement of FIG. 16 in a scenario in which the threshold is exceeded according to certain embodiments.

DETAILED DESCRIPTION

In the following description, various embodiments will be described. For purposes of explanation, specific configuration and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and multiple mobile drive units for moving the inventory holders. Specific features are directed to mechanical tipping assemblies that can be included in the mobile drive units. Mechanical tipping assemblies can include components that move in response to—and/or under the influence of—reaction forces, such as may be experienced due to acceleration or deceleration. For example, the mechanical tipping assemblies may include pivoting linkages and/or other components that may rotate, translate, swing, and/or otherwise move when subjected to forces generated by changes in motion of the mobile drive unit. Such components may move passively, e.g., without and/or independent of forces provided by actuators, servos, motors, or other actively controlled force-producing mechanisms. Movement of components of a mechanical tipping assembly may cause a corresponding change in position and/or orientation of an inventory holder docked with the mobile drive unit. For example, in response to a sudden deceleration of a mobile drive unit carrying an inventory holder, a mechanical tipping assembly may cause a top of the inventory holder to tilt counter to a direction of deflection and/or bending induced by the deceleration and so reduce a size of a space in which the inventory holder may collide with other objects due to the deceleration.

Figure 1:
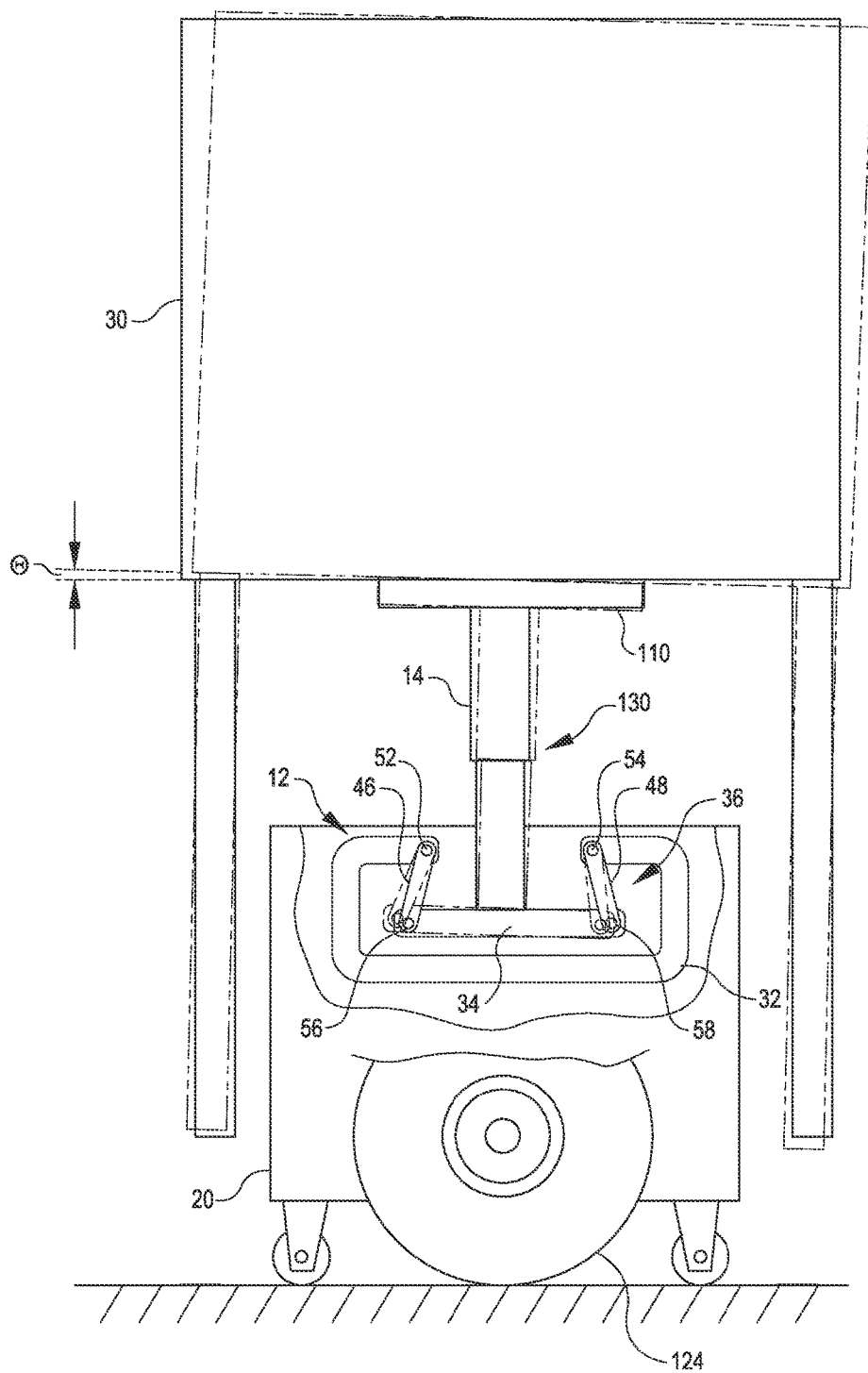
FIG. 1 illustrates an example of a mobile drive unit having a mechanical tipping assembly according to certain embodiments.

Turning now to the drawings, FIG. 1 illustrates an example of a mobile drive unit 20 carrying an inventory holder 30. In this depicted arrangement, the mobile drive unit 20 includes a mechanical tipping assembly 12. In FIG. 1, a portion of the body of the mobile drive unit 20 is shown partially cut away for better visibility of elements of the mechanical tipping assembly 12.

The mechanical tipping assembly 12 includes at least a frame 32, a base 34, and a pivot assembly 36. The frame 32 is mounted at least partially in or on a body of the mobile drive unit 20. The base 34 is suspended from the frame 32 by the pivot assembly 36.

The pivot assembly 36 can include any structure that allows the base 34 to at least partially move relative to the frame 32 in response to forces acting on the base 34. For example, in FIG. 1, the pivot assembly 36 is shown having a first link 46 and a second link 48. The first link 46 is pivotally coupled with the frame 32 at a first location 52, and the second link 48 is pivotally coupled with the frame 32 at a second location 54. Downward from the first location 52, the first link 46 is also pivotally coupled with the base 34. Similarly, downward from the second location 54, the second link 48 is also pivotally coupled with the base 34. Specifically in FIG. 1, the first link 46 is coupled with the base 34 at a third location 56, and the second link 48 is coupled with the base 34 at a fourth location 58. The first link 46 and the second link 48 are arranged in FIG. 1 such that a distance between the first location 52 and the second location 54 is smaller than a distance between the third location 56 and the fourth location 58. Additionally, the first link 46 and the second link 48 are arranged in FIG. 1 such that each forms an acute angle with the base 34 when the base 34 is at rest.

A docking head 110 is provided for engaging the inventory holder 30 and supporting the inventory holder 30 relative to the mobile drive unit 20. The docking head 110 is supported from beneath by the base 34, for example, by a column 14. The column 14 is depicted in FIG. 1 with a docking actuator 130 that allows two sections of the column 14 to move relative to one another for lifting the inventory holder 30; however, in other embodiments, the column 14 may include a different number of sections (including a single continuous section or more than two sections) and/or other lifting mechanisms may be utilized. Additional examples of suitable lifting mechanisms are described with respect to FIG. 15. The base 34 can include any suitable structure (e.g., a bar or a plate) for supporting the docking head 110.

The connection between the base 34 and the docking head 110 can cause a corresponding movement in the docking head 110 for any movement by the base 34. For example, shifting from the state shown in solid lines to the state shown in phantom lines, a leftward movement and/or clockwise rotation of the base 34 may cause a corresponding rightward movement and/or clockwise rotation of the docking head 110. This may in turn cause a bottom of the inventory holder 30 to tilt by an angle θ. Tilting of the inventory holder 30 by an angle θ may be useful for a variety of purposes, such as to allow a center of gravity of the inventory holder 30 to shift to a position more directly aligned over wheels 124 (e.g., for improved traction and/or stability), or to shift the inventory holder 30 into a favorable position in response to acceleration or deceleration of the mobile drive unit 20 (e.g., to reduce a size of suitable buffer zones about the mobile drive unit 20 during starting or stopping and/or to improve reliability of motion of components).

In FIG. 1, the frame 32 is shown with an upward-facing C-shape, but the frame 32 could alternatively include other arrangements, including, but not limited to one or more pieces that form opposite sides of the frame 32. Moreover, the frame 32 may be integrally formed into the body of the mobile drive unit 20 or installed as a separate component. Additionally, although the first link 46 and the second link 48 are shown in FIG. 1 pivotally coupled at respective ends of the frame 32, the base 34, and the links 46, 48, in alternative embodiments, the first link 46 and/or second link 48 may be coupled at a position other than one of these respective ends. Furthermore, although only one first link 46 and one second link 48 are visible in FIG. 1, in various embodiments, additional links may be included in the pivot assembly 36. For example, additional links may be included parallel to the depicted first link 46 and second link 48 (e.g., positioned into or out of the page with respect to FIG. 1), such as to support the base 34 at corners, ends, or other locations along a depth of the base 34 running into or out of the page.

Figure 2:
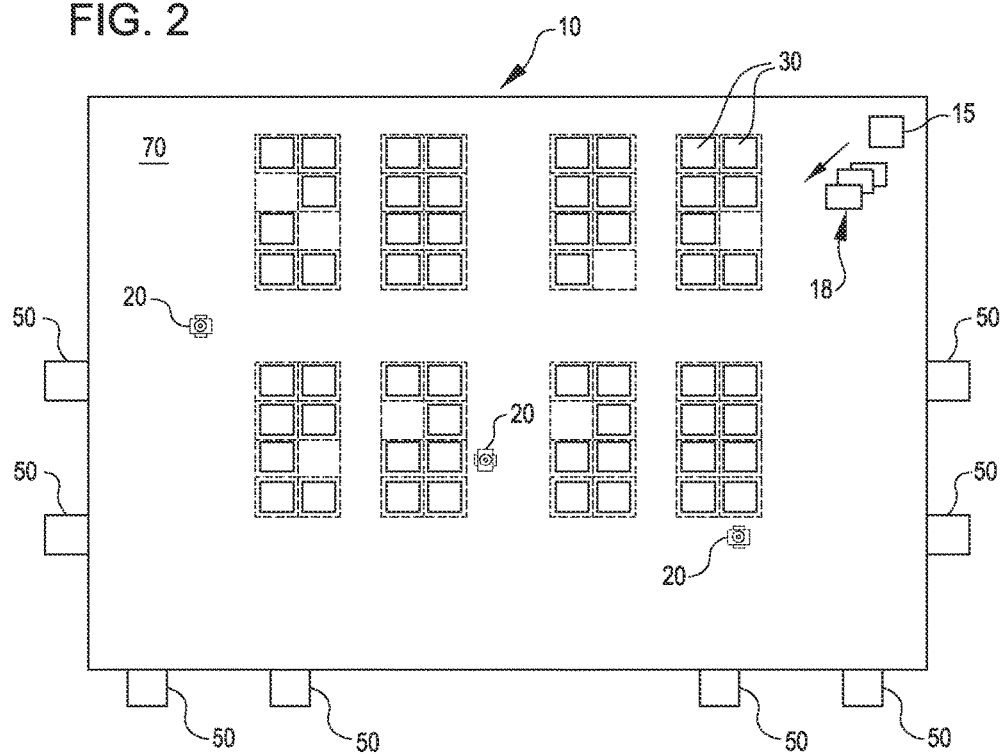
FIG. 2 illustrates components of an inventory system that may utilize the mobile drive unit of FIG. 1 according to certain embodiments.

FIG. 2 illustrates the components of an inventory system 10 in which the mobile drive unit 20 may operate. Inventory system 10 includes a management module 15, one or more mobile drive units 20 (such as the mobile drive unit 20 shown in FIG. 1 and/or other types of mobile drive units 20), one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. Various components and operations of example embodiments of mobile drive units 20 are discussed further below with respect to FIGS. 4-5 and 13-15.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA)

standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying (pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
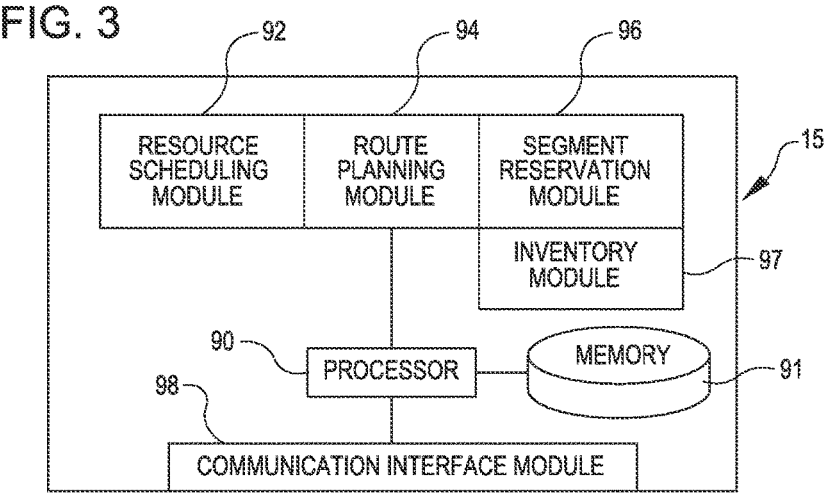
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
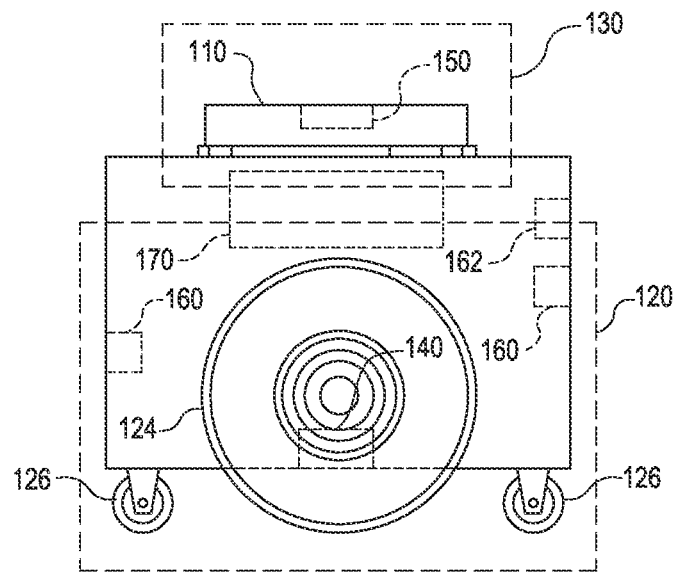
FIGS. 4 and 5 illustrate in greater detail an example mobile drive unit that may be utilized in particular embodiments of the inventory system shown in FIG. 2.
Figure 5:
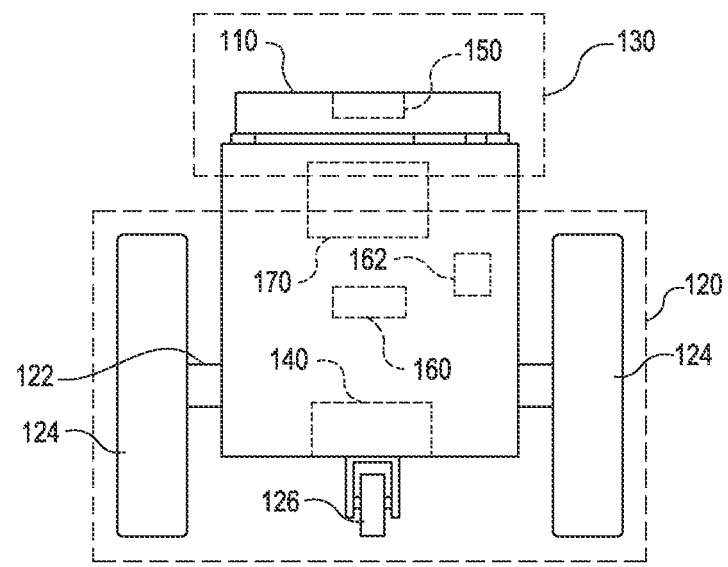

FIGS. 4 and 5 illustrate in greater detail various components of a particular embodiment of mobile drive unit 20. FIGS. 4 and 5 are not intended to be exhaustive. For example, in order to more clearly show features in FIGS. 4 and 5, some features shown elsewhere herein (e.g., the mechanical tipping assembly 12 shown in FIG. 1) are not repeated in FIGS. 4 and 5. However, these and/or other features not shown in FIGS. 4 and 5 may nonetheless be included in mobile drive unit 20.

In particular, FIGS. 4 and 5 include a front and side view of an example mobile drive unit 20. The illustrated mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 7-12 illustrate operation of particular embodiments of mobile drive unit 20 and inventory holder 30 during docking, movement, and undocking.

FIG. 7 illustrates mobile drive unit 20 and inventory holder 30 prior to docking. As noted above with respect to FIG. 2, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 7 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video-processing components, to detect fiducial marks 450.

FIG. 8 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

FIG. 9 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

FIG. 10 illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

FIG. 11 illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 450, fiducial mark 450B, associated with the undocking location. Mobile drive unit 20 determines its location based on fiducial mark 450B and, as a result, determines that it has reached the undocking location. After determining that it has reached the undocking location, mobile drive unit 20 initiates an appropriate undocking process based on the configuration and characteristics of mobile drive unit 20 and inventory holder 30.

FIG. 12 illustrates a mobile drive unit 20 and inventory holder 30 subsequent to undocking. Mobile drive unit 20 may then move away, as suggested by arrow 430, from inventory holder 30 and begin responding to other commands received by mobile drive unit 20.

As described above, embodiments herein are directed to mobile drive units 20 having mechanical tipping assemblies 12. Mechanical tipping assemblies 12 may find particular use in reducing an amount of "sway" encountered in an inventory system 10. An illustrative example of this function will now be described with respect to FIGS. 13 and 14.

Figure 13:
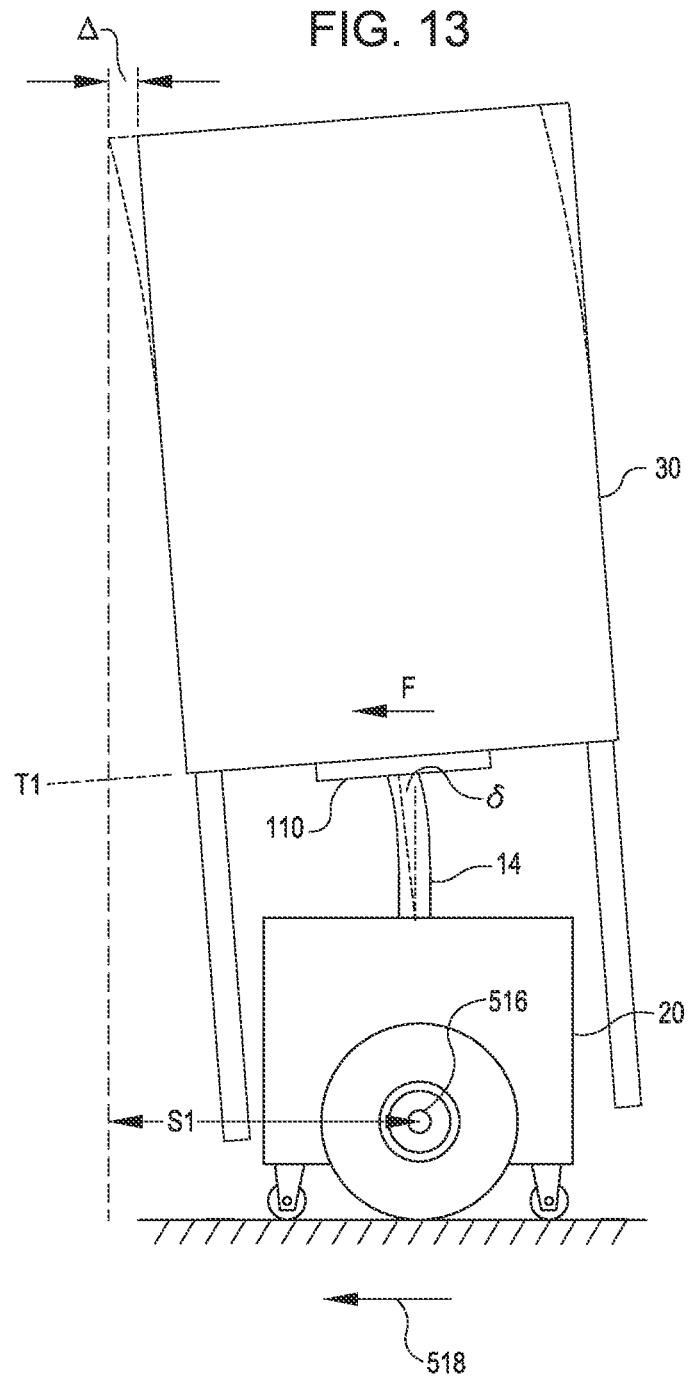
FIG. 13 illustrates an example of a docked mobile drive unit and inventory holder (e.g., of the inventory system shown in FIG. 2) experiencing sway according to particular embodiments.

FIG. 13 illustrates an example of a docked mobile drive unit 20 and inventory holder 30. The state depicted in FIG. 13 corresponds to a situation in which effects of a mechanical tipping assembly 12 are unavailable, such as if the mechanical tipping assembly 12 were disabled or omitted. Forces F acting on the mobile drive unit 20 and inventory holder 30 can cause an amount of sway S1.

The forces F may correspond to resultant or reaction forces from acceleration or deceleration. For example, the leftward forces F depicted in FIG. 13 may correspond to forces acting on the mobile drive unit 20 and inventory holder 30 due to braking or deceleration of the mobile drive unit 20 while traveling in the leftward direction (depicted by the leftward arrow 518).

The amount of sway S1 can correspond to the maximum distance away from a reference point (e.g., a drive axis 516) of the mobile drive unit 20 that is reached by any part of the docked mobile drive unit 20 and/or inventory holder 30. The amount of sway S1 may be a result of translation, deflection, and/or other location or orientation changes due to the forces F acting on the mobile drive unit 20 and inventory holder 30. For example, the amount of sway S1 in FIG. 13 accounts for an amount of bending and/or deflection $\delta$ of a column 14 supporting the docking head 110 due to the forces F, as well as an amount of bending and/or deflection $\Delta$ of an upper portion of the inventory holder 30 due to the forces F. Although a significant amount of sway S1 from bending and/or deflection is shown in FIG. 13 for the sake of visibility, the total amount of sway S1 may be less extreme in operation and/or account for movement of other components not specifically shown as bending or shifting in FIG. 13, e.g., other components or portions of the mobile drive unit 20 and/or inventory holder 30. As an illustrative example, for an inventory holder 30 having a height of about 6 feet (about 1.8 meters), a total amount of sway S1 from a deceleration operation of a docked mobile drive unit 20 may be on the order of about 1 inch (about 2.5 cm). In some aspects, the bending and/or deflection $\delta$ of the column 14 supporting the docking head 110 (and/or other shifts due to the forces F) may also tilt the inventory holder 30 and cause a bottom of the inventory holder 30 to be aligned along a first axis T1.

FIG. 14 illustrates the docked mobile drive unit 20 and inventory holder 30 with an operational mechanical tipping assembly 12. The mechanical tipping assembly 12 is an example of the mechanical tipping assembly 12 of FIG. 1, and like elements are identified with like names and reference numbers. The mechanical tipping assembly 12 is configured to yield a reduced amount of sway S2 in comparison to the amount of sway S1 that would be encountered in the absence of the operational mechanical tipping assembly 12 (e.g., in the condition illustrated in FIG. 13). For example, under the same forces F described with respect to FIG. 13, the base 34 can be pushed toward the left (e.g., from the position shown in solid lines in FIG.) to the position shown in FIG. 14. The first link 46 and the second link 48 constrain the movement of the base 34 and cause the base 34 to rotate clockwise as the base 34 shifts leftward. This clockwise rotation causes a corresponding rotation of the inventory holder 30, e.g., orienting the bottom of the inventory holder 30 along a second axis T2 offset from the first axis T1 of FIG. 13 by an angle $\alpha$. Thus, even if the same deflections d of the column 14 and deflections $\Delta$ of an upper portion of the inventory holder 30 occur due to the forces F, the inventory holder 30 is tipped away from the direction of the reaction forces F by an angle $\alpha$, which can yield a total amount of sway S2 that is less than the amount of sway S1 encountered in the absence of the mechanical tipping assembly 12. Although the leftward shift of the base 34 may cause some corresponding leftward translation of the inventory holder 30, in many situations, the amount a that the inventory holder 30 is tipped through rotation is sufficient to offset this small translation such that the overall amount of sway S2 is reduced in total by the movement of the base 34.

FIG. 15 is a schematic illustration showing various components of a mechanical tipping assembly 12 in greater detail according to certain embodiments. In some embodiments, the mechanical tipping assembly 12 can include elements to constrain movement of the mechanical tipping assembly 12 within certain parameters. In FIG. 15, the mechanical tipping assembly 12 is schematically shown with constraining elements that include a damper 564 and a spring or other biasing mechanism 566.

The damper 564 may be provided, for example, to reduce oscillation of the base 34 that may otherwise occur unchecked in response to forces exerted on the base 34. Examples of suitable dampers 564 include linear dashpots, rotary dashpots, eddy current dampers, hydraulic dashpots, and/or non-hydraulic dashpots. In some aspects, the damper 564 may be adjustable. For example, damping characteristics of the damper 564 may be adjusted, such as during routine maintenance or between one or more task assignments of the mobile drive unit 20. Any method of adjusting damping characteristics may be utilized, including, but not limited to adjusting a size of an internal orifice to regulate fluid flow, or changing a magnetic field around a damper having fluid with magnetic particles. In some aspects, the damper 564 may be actively managed, e.g., automatically modifying a damping amount provided by the damper 534 based on information from the management module 15 and/or mobile drive unit 20 about motion of the mobile drive unit 20 and/or other factors in the inventory system 10 expected to affect (or affecting) forces acting on the tipping assembly 12 or other related elements. Although FIG. 15 shows the damper 564 coupled with the second link 48, one or more dampers 564 may additionally or alternatively be positioned differently or otherwise coupled with any appropriate component of the tipping assembly 12 for constraining operation of the tipping assembly 12.

The biasing mechanism 566 may be provided, for example, to bias the base 34 or other component of the mechanical tipping assembly 12 toward a position (e.g., into an initial position to offset forces that may occur due to a mobile drive unit 20 carrying an inventory holder 30 with a center of gravity that is not centrally aligned) or away from a position (e.g., to reduce a chance that the base 34 may strike the frame 32 due to sudden acceleration or deceleration). Examples of suitable biasing mechanisms 566 include springs, or other elastic components or members. In some aspects, characteristics of the biasing mechanism 566 may be adjustable, such as by adjusting an elastic property of a component, or by adjusting a tension on a coiled spring. In some aspects, the biasing mechanism 566 may be actively managed, e.g., automatically modifying characteristics of the biasing mechanism 566 based on information from the management module 15 and/or mobile drive unit 20 about motion of the mobile drive unit 20 and/or other factors in the inventory system 10 expected to affect (or affecting) forces acting on the tipping assembly 12 or other related elements. Although FIG. 15 shows the biasing mechanism 566 coupled with the second link 48, one or more the biasing mechanisms 566 may additionally or alternatively be positioned differently or otherwise coupled with any appropriate component of the tipping assembly 12 for constraining operation of the tipping assembly 12.

The first link 46 and the second link 48 are shown in FIG. 15 as straight bars of approximately the same size. This may allow the mechanical tipping assembly 12 to provide a similar response regardless of the direction of forces applied (e.g., regardless of whether forces are applied from the right or from the left of FIG. 15, or regardless of whether the mobile drive unit 20 drives forward or backward). However, other arrangements are also possible. For example, the first link 46 and/or the second link 48 may be different from one another, such as to provide different responses based on the direction of travel or of force application. Additionally, the first link 46 and/or the second link 48 may have geometric profiles other than straight bars, such as curved, arcuate or angled members.

Components of the mechanical tipping assembly 12 may be calibrated to provide different responses to forces that differ in magnitude and/or directions. For example, the geometry, material, strength, and/or other characteristics of the different components of the mechanical tipping assembly 12 (including, but not limited to the base 34, first link 46, second link 48, damper 564, and/or biasing mechanism 566) may be selected according to expected or detected forces and any of the desired tipping angle, deflection, oscillation, and/or rates of change of these or other characteristics.

Any suitable lifting mechanism 572 or combination of lifting mechanisms 572 (individually identified as 572A-E in FIG. 15) may be utilized for moving the platform of the docking head 110 relative to an inventory holder 30. For example, the column 14 may include a lifting mechanism 572D (e.g., the docking actuator 130 described above with respect to FIG. 1) that causes the column 14 to be extendable and retractable tier moving the docking head 110. Additionally or alternatively, a lifting mechanism 572A may be situated to lift the frame 32 to cause movement of the docking head 110. Additionally or alternatively, lifting mechanisms 572B and/or 572C may be situated to respectively change a length of the first link 46 and/or the second link 48 to cause movement of the docking head 110, such as raising the docking head 110 by shortening the first link 46 and/or the second link 48, or lowering the docking head 110 by extending the first link 16 and/or the second link 48. Additionally or alternatively, a lifting mechanism 572E may be configured to extend from the docking head 110 to cause movement of an inventory holder 30 engaged with the docking head 110. Lifting mechanisms 572A-E can include any suitable structure to accomplish lifting, including, but not limited to piston-cylinder arrangements, hydraulic/pneumatic cylinders, solenoids, screw-driven components, rack-and-pinion arrangements, other linear actuators, scissor-type lifts, and any other lifting structures. In some embodiments, one or more of the lifting mechanisms 572A-E can additionally or alternatively include or be replaced by structure that facilitates rotation of the docking head 110, such as to rotate a carried inventory holder 30 so as to present a face of the inventory holder 30 toward an operator and/or toward some other particular direction.

In various embodiments, the mechanical tipping assembly 12 can include features that permit one or more components of the tipping assembly 12 to be locked or immobilized. For example, in FIG. 15, the mechanical tipping assembly 12 includes a stopper or brake 573 that can be moved by an actuator 575 into engagement with the base 34 to prevent movement of the base 34 and out of engagement to allow movement of the base 34. Additionally or alternatively, the brake 573 or other locking mechanism may engage a movable element other than the base 34, such as the first link 46, the second link 48, and/or the column 14. In another example, locking may be provided by controlling the damper 564 so as to be essentially rigid, such as by completely closing—or closing within a particular threshold—an internal orifice for fluid passage. In some embodiments, locking, braking, and/or other constraining functionality for the tipping assembly 12 may allow unwanted tipping to be prevented or reduced. For example, this may include unwanted tipping that could result from an inventory holder 30 carried by the tipping assembly 12 having a center of gravity that is not balanced over the tipping assembly 12, and/or unwanted tipping that could be caused by low magnitude forces that may be exerted on a carried inventory holder 30 as a result of loading, unloading, or other interactions of an operator with the carried inventory holder 30.

In some embodiments, one or more elements can be configured to remain stationary or in place until three applied to the element exceeds a threshold. This may prevent, reduce, and/or constrain certain types and/or amounts of tipping. For example, this may prevent tipping that may result from lower magnitude threes (e.g., associated with a carried inventory holder having a non-centered center of gravity and/or associated with forces from an operator interacting with a carried inventory holder), yet allow tipping that may result from larger magnitude forces (e.g., associated with reaction forces from acceleration or deceleration). An illustrative example of an arrangement that restricts movement until a force threshold is reached is provided in FIGS. 16-17. Other arrangements, however, may also be utilized.

FIG. 16 illustrates an element 574 positioned between threshold assemblies 576 (individually depicted in FIG. 16 as a first threshold assembly 576A and a second threshold assembly 576B). The element 574 may correspond to, for example, the first link 46, the second link 48, the base 34, the column 14, and/or some other moveable element of the mechanical tipping assembly 12 described above with respect to FIG. 15. Each threshold assembly 576 may prevent or restrict motion of the element 574 in a particular direction in response to an amount of force acting on the element 574 below a certain threshold. For example, the first threshold assembly 576A may prevent movement of the element 574 due to low magnitude forces oriented toward the right of FIG. 16, and the second threshold assembly 576B may prevent movement of the element 574 due to low magnitude forces oriented toward the left of FIG. 16.

The first threshold assembly 576A depicted in FIG. 16 includes a biasing mechanism 578A, an interface 580A, a connection shaft 582A, a mount 584A, and a stopper 586A. The mount 584A may correspond to a portion of the frame 32, some other feature of the mechanical tipping assembly 12 described above with respect to FIG. 15, and/or some other structure. The interface 580A may include a plunger or other structure that may conform to or otherwise engage the element 574 when the element 574 is moving or stationary. The interface 580A is connected to the stopper 586A via the connection shaft 582A. The connection shaft 582A extends through an opening in the mount 584A such that the interface 580A and stopper 586A are positioned on opposite sides of the mount 584A. Thus, movement of the stopper 586A away from the mount 584A can cause movement of the interface 580A toward the mount 584A, and vice versa.

The stopper 586A is configured to prevent the interface 580A from extending beyond a certain distance from the mount 584A. For example, the depicted stopper 586A is larger than the opening in the mount 584A such that movement of the stopper 586A toward the mount 584A (e.g., in the leftward direction of FIG. 16) will eventually bring the stopper 586A into an abutting engagement with the mount 584A that will prevent further movement of the interface 580A away from the mount 584A (e.g., in the leftward direction of FIG. 16). In some embodiments, the stopper 586A corresponds to a nut or other structure that can be coupled at different positions along the connection shaft 582A, such as to adjust a length of the connection shaft 582A between the stopper 586A and interface 580A and accordingly change a maximum distance the interface 580A can extend from the mount 584A.

The biasing mechanism 578A can exert a biasing force against the interface 580A and away from the mount 584A (e.g., toward the leftward direction of FIG. 16). For example, the biasing mechanism 578A may include one or more compression springs (two are shown in FIG. 16) that are at least partially compressed between the interface 580A and the mount 584A when the interface 580A is at the maximum distance from the mount 584A permitted by the stopper 586A. The biasing mechanism 578A may additionally or alternatively include other elements for providing the biasing force, including but not limited to hydraulic cylinders or airbags. In some examples, a magnitude of the biasing force may be variable, such as by altering a distance between the stopper 586A and the interface 580A (e.g., by changing a placement of the stopper 586A on the connection shaft 582A, or by use of an actuator or other mechanism to change a length of the connection shaft 582A) and/or by altering a characteristic of the biasing mechanism 578A (e.g., by replacing a spring having one stiffness with a spring having a different stiffness, or by changing a pressure within a damper or air bag). The biasing force provided by the biasing mechanism 578A may prevent the interface 580A from moving toward the mount 584A in the absence of forces that are greater than the biasing force and oriented opposite the biasing force. The interface 580A may be aligned with the element 574 so that movement of the element 574 toward the mount 584A (e.g., toward the right of FIG. 16) is resisted by the biasing force acting on the interface 580A. Thus, the first threshold assembly 576A may prevent movement of the element 574 in a first direction (e.g., toward the right of FIG. 16) until force applied to the element 574 exceeds a threshold (e.g., a magnitude sufficient to overcome the biasing force from the biasing mechanism 578A). Similar features (e.g., identified by the suffix B instead of the suffix A in FIGS. 16 and 17) can also be included in the second threshold assembly 576B, for example, such that the second threshold assembly 576B may prevent movement of the element 574 in a second direction (e.g., toward the left of FIG. 16) until force applied to the element 574 exceeds a threshold (e.g., a magnitude sufficient to overcome the biasing force from the biasing mechanism 578B).

FIG. 17 illustrates the element 574 of FIG. 16 in a deflected configuration. Specifically, in this illustrated configuration, the element 574 has been rotated from the position shown in FIG. 16 and toward the left of FIG. 17, e.g., in a clockwise direction about a top end of the element 574, as illustrated by arrow 588. The deflection may be a result of forces acting on the element 574 (e.g., toward the left of FIG. 17) with sufficient magnitude to overcome the biasing force (e.g., oriented toward the right of FIG. 17) provided by the biasing mechanism 578B of the second threshold assembly 576B. This deflection may cause corresponding movement in the second threshold assembly 576B. For example, the movement of the element 574 toward the left in FIG. 17 may likewise move the interface 580B leftward (e.g., toward mount 584B) and cause a corresponding movement of the stopper 586B leftward (e.g., away from the mount 584B). Such movement in the second threshold assembly 576B may be independent of movement in the first threshold assembly 576A. For example, in the depicted arrangement, the stopper 586A of the first threshold assembly 576A may prevent the interface 580A from moving away from the mount 584A to follow the depicted movement of the element 574 away from the mount 584A. Such an arrangement may allow the first threshold assembly 576A and the second threshold assembly 576B to resist movement of the element 574 in different directions in response to forces below respective particular thresholds. This may prevent the element 574 from moving until a sufficient magnitude of force is applied to the element 574, such as due to acceleration or deceleration activities of a mobile drive unit 20 having the element 574.

Based at least in part on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system comprising:
  a mobile drive unit configured to carry an inventory holder within a facility, the inventory holder comprising one or more compartments holding one or more inventory items, the mobile drive unit comprising:
    a frame;
    a wheel coupled with the frame and rotatable about a wheel axis of rotation to move the frame and cause acceleration or deceleration of the mobile drive unit;
    a docking head assembly comprising a platform configured to engage the inventory holder and support the inventory holder over the frame of the mobile drive unit when the inventory holder is carried by the mobile drive unit;
    a base supporting the docking head assembly from underneath, at least one of the base or the docking head assembly subject to a reaction force oriented toward a first direction in response to acceleration or deceleration of the mobile drive unit when the inventory holder is carried by the mobile drive unit; and
    a pivot assembly suspending the base from the frame so that the docking head and base are each moveable relative to the frame and such that a top of the inventory holder will tip away from the first direction in response to movement of the base or the docking head assembly caused by the reaction force, the pivot assembly comprising:
      a first link pivotally coupled with the frame at a first location and pivotally coupled with the base downward from the first location; and
      a second link pivotally coupled with the frame at a second location and pivotally coupled with the base downward from the second location, the base being coupled with the first link at a third location and with the second link at a fourth location such that a distance between the third location and the fourth location is greater than a distance between the first location and the second location, wherein the first link and the second link are each pivotally coupled to the base and frame for rotation about axes of rotation that are substantially parallel to the wheel axis of rotation.

2. The inventory system of claim 1, wherein the mobile drive unit further comprises a damper positioned and configured to reduce oscillations of the base in response to the reaction force.

3. The inventory system of claim 1, wherein the mobile drive unit further comprises a spring positioned and configured to control a maximum deflection of the base in response to the reaction force.

4. The inventory system of claim 1, wherein the mobile drive unit further comprises a lifting mechanism for moving the platform of the docking head assembly relative to the mobile drive unit for lifting and lowering the inventory holder relative to the mobile drive unit.

5. A mobile drive unit for an inventory system, the mobile drive unit comprising:
  a frame;
  a docking head assembly comprising a platform configured to engage an inventory holder, the platform supporting the inventory holder over the frame of the mobile drive unit when the inventory holder is carried by the mobile drive unit;
  a base supporting the docking head assembly from beneath; and
  a pivot assembly coupled between the frame and the base so that the base is suspended from the frame by the pivot assembly and so that the docking head and base are each moveable relative to the frame, the pivot assembly pivotally coupled with the frame and the base such that a reaction force acting on the base in response to acceleration or deceleration of the mobile drive unit moves the base so as to cause the docking head assembly to tip away from a direction of the reaction force, wherein the pivot assembly comprises:
    a first link coupled with a first side of the base; and
    a second link coupled with a second side of the base opposite the first side of the base, wherein the first link and the second link are coupled with the base a first distance apart from one another and coupled with the frame a second distance apart from one another that is smaller than the first distance.

6. The mobile drive unit of claim 5, wherein the first link and the second link each extend downward from the frame and form an acute angle with the base when the mobile drive unit is stationary and the base is stationary.

7. The mobile drive unit of claim 5, further comprising:
  a first plurality of links coupled with the first side of the base and including the first link; and
  a second plurality of links coupled with the second side of the base and including the second link.

8. The mobile drive unit of claim 5, further comprising at least one of:
  a lifting mechanism configured to lift the frame so as to move the platform of the docking head assembly relative to the mobile drive unit for lifting the inventory holder;
  a lifting mechanism comprising an extendable column between the base and the platform of the docking head assembly for movement of the platform relative to the mobile drive unit for lifting the inventory holder;
  a lifting mechanism comprising the first link and the second link each being retractable so as to move the platform of the docking head assembly relative to the mobile drive unit for lifting the inventory holder; or
  a lifting mechanism configured to extend from the platform for lifting the inventory holder.

9. The mobile drive unit of claim 5, further comprising a damper positioned and configured to reduce oscillations of the base in response to the reaction force.

10. The mobile drive unit of claim 5, further comprising a biasing mechanism positioned and configured to control a maximum deflection of the base in response to the reaction force.

11. A tipping assembly for a mobile drive unit of an inventory system, the tipping assembly comprising:
   a frame;
   a first link pivotally coupled with the frame at a first location and extending downward from the frame;
   a second link pivotally coupled with the frame at a second location and extending downward from the frame;
   a base pivotally coupled with the first link downward from the first location and pivotally coupled with the second link downward from the second location, wherein the first link and the second link are coupled with the base a first distance apart from one another and coupled with the frame a second distance apart from one another that is smaller than the first distance; and
   a docking head assembly comprising a platform configured to engage an inventory holder to support the inventory holder over the frame, the docking head assembly supported by the base from beneath so that the docking head and base are each moveable relative to the frame and such that a reaction force acting on the base in response to acceleration or deceleration moves the base so as to cause the docking head assembly to tip away from a direction of the reaction force.

12. The tipping assembly of claim 11, further comprising a lifting mechanism configured to lift the frame so as to move the platform of the docking head assembly relative to the mobile drive unit for lifting the inventory holder.

13. The tipping assembly of claim 11, further comprising a lifting mechanism comprising an extendable column between the base and the platform of the docking head assembly for movement of the platform relative to the mobile drive unit for lifting the inventory holder.

14. The tipping assembly of claim 11, wherein the first link and the second link are each retractable so as to move the platform of the docking head assembly relative to the mobile drive unit for lifting the inventory holder.

15. The tipping assembly of claim 11, further comprising a lifting mechanism configured to extend from the platform for lifting the inventory holder.

16. The tipping assembly of claim 11, wherein the first link is approximately a same length as the second link.

17. The tipping assembly of claim 11, further comprising a biasing assembly positioned and configured to permit movement of a link or other movable element of the tipping assembly when force applied to the link or other movable element is greater than a threshold amount and to prevent movement of the link or other movable element of the tipping assembly when force applied to the link or other movable element is less than the threshold amount.

* * * * *